United States Patent [19]
Ishihara

[11] Patent Number: 5,943,945
[45] Date of Patent: Aug. 31, 1999

[54] COFFEEMAKER

[76] Inventor: Naoki Ishihara, No. 1649, Tower 7, Hong Kong Parkview, 88 Tai Tam Reservoir Road, Hong Kong, The Hong Kong Special Administrative Region of the People's Republic of China

[21] Appl. No.: 08/931,596

[22] Filed: Sep. 16, 1997

[51] Int. Cl.⁶ .................................................. A47J 31/00
[52] U.S. Cl. ................................ 99/288; 99/290; 99/304
[58] Field of Search ........................... 99/288, 290, 279, 99/304, 306; 222/146.2, 146.5, 192

[56] References Cited

U.S. PATENT DOCUMENTS

| | | |
|---|---|---|
| 368,340 | 8/1887 | Kaplan ........................... 99/288 |
| 2,638,839 | 5/1953 | Raiteri ......................... 99/288 X |
| 3,083,450 | 4/1963 | Harvey ......................... 99/288 |
| 4,495,404 | 1/1985 | Carmichael ..................... 99/288 X |

*Primary Examiner*—Reginald L. Alexander
*Attorney, Agent, or Firm*—Tod R. Nissle, P.C.

[57] ABSTRACT

A self-contained beverage machine simulataneously heats a beverage and a condiment utilized in the beverage. The condiment is in a small container removably carried on the beverage machine.

5 Claims, 5 Drawing Sheets

COFFEEMAKER

CROSS REFERENCES TO RELATED APPLICATIONS

Not Applicable.

STATEMENT REGARDING FEDERALLY SPONSORED RESEARCH OR DEVELOPMENT

Not Applicable.

Reference to a "Microfiche Appendix"

Not Applicable.

BACKGROUND OF THE INVENTION

Field of the Invention

This invention relates to a beverage machine.

More particularly, the invention relates to a beverage machine which dispenses hot beverages.

In a further respect, the invention relates to a beverage machine which simultaneously heats a beverage and a condiment utilized in the beverage.

DESCRIPTION OF THE RELATED ART INCLUDING INFORMATION DISCLOSED UNDER 37 C.F.R. 1.97 AND 1.98.

Cream, milk, sugar, lemon juice and other condiments have long been utilized in coffee, tea and other beverages which are served hot. In some countries, the condiments added to a hot beverage are tepid or are cold. In other countries, the condiments added to a hot beverage preferably are heated so that the temperature of the beverage is not reduced when the condiment is added. When it is desired to heat a condiment, a separate pan or heating apparatus has long been utilized. For example, U.S. Pat. No. 4,848,216 to Robau discloses a steam heated milk warmer. The milk warmer includes a chamber which holds water. A pitcher of milk is placed in the chamber such that the bottom portion of the chamber is immersed in the water. Steam is utilized to heat the water. The water heats the milk in the pitcher. The steam is provided by a coffee making machine. There are several disadvantages associated with the Robau milk warmer. First, the Robau milk warmer is complicated, especially for use in the home of a consumer. Most consumers will not interconnect a coffeemaker with a milk warmer to transfer steam from one to the other. Second, MR. COFFEE and other coffeemakers utilized in the homes of consumers ordinarily do not provide a sufficient steam to power the Robau milk warmer. Third, MR. COFFEE and other home coffeemakers are not equipped to provide steam to an auxiliary milk warming apparatus. Fourth, the Robau milk warmer takes up additional counter space. Many consumers heat milk in a microwave instead of utilizing the Robau milk warmer.

Accordingly, it would be highly desirable to provide improved coffee making apparatus which would facilitate the heating of condiments utilized in hot beverages.

Therefore, it is a principal object of the invention to provide improved apparatus for heating condiments.

A further object of the invention is to provide condiment heating apparatus which does not require steam to heat water which is utilized to heat a condiment.

Another object of the invention is to provide condiment heating apparatus which in use does not occupy additional counter space.

Yet a further object of the invention is to provide condiment heating apparatus which in use is concealed from view.

Still another object of the invention is to provide condiment heating apparatus which is integrated with apparatus that performs a function other than heating a condiment.

Yet still a further object is to provide a simple, relatively inexpensive way of warming up a condiment while minimizing the chance of forgetting to heat the condiment while a beverage is brewed.

BRIEF DESCRIPTION OF THE SEVERAL VIEWS OF THE DRAWINGS

These and other, further and more specific objects and advantages of the invention will be apparent to those skilled in the art from the following detailed description thereof, taken in conjunction with the drawings, in which.

BRIEF SUMMARY OF THE INVENTION

Figure 1A:
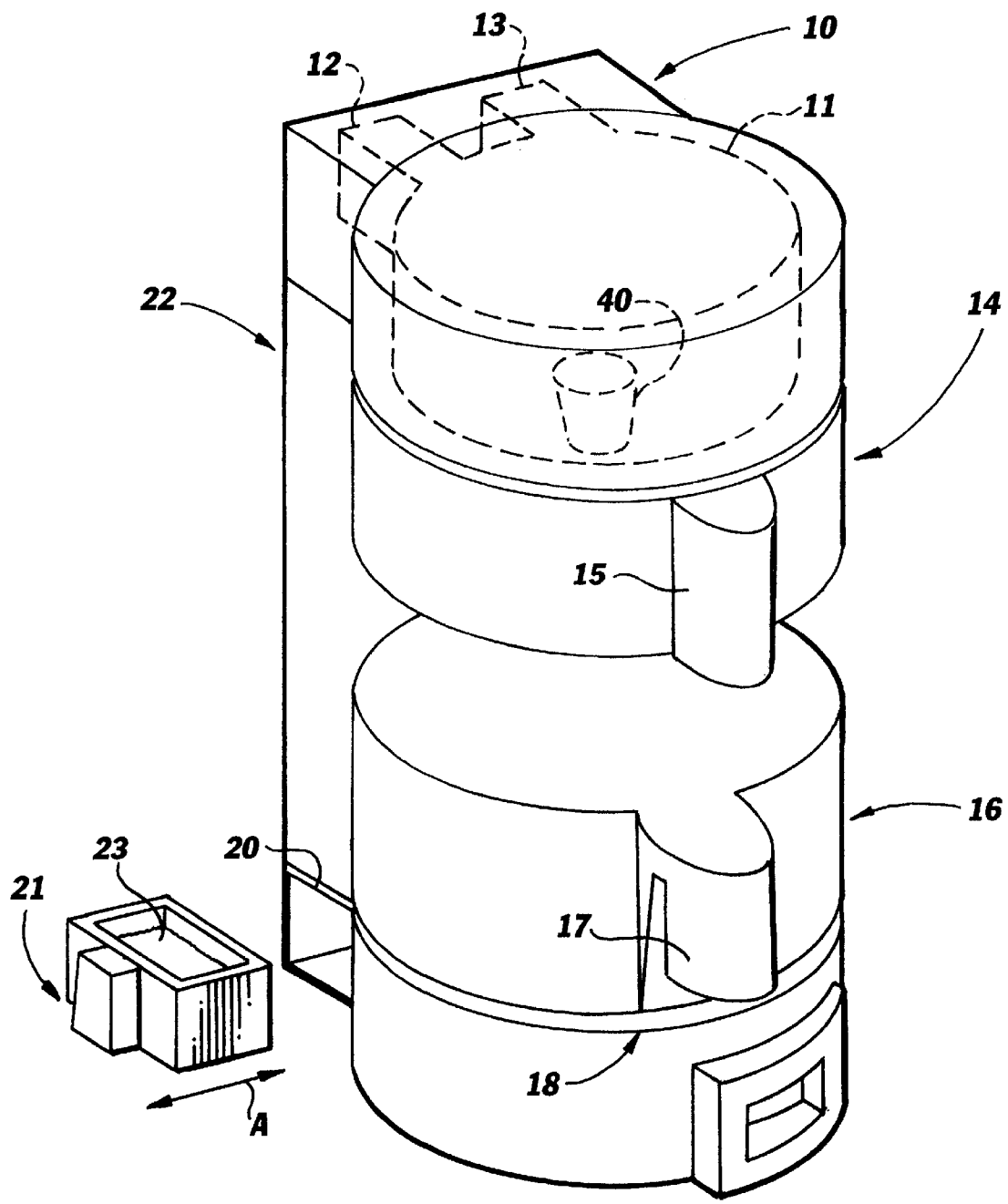
FIGS. 1A to 1C are perspective views illustrating coffee makers constructed in accordance with the invention and including condiment heating apparatus concealed therein.

Briefly, in accordance with my invention, I provide a beverage brewing apparatus including a housing having a reservoir for a supply of liquid; a heating unit mounted on the housing and operatively associated with the reservoir for heating the liquid; a receptacle for receiving heated liquid from the reservoir; a dispenser mounted on the housing for dispensing heated liquid from the reservoir into the receptacle; a primary heat transfer unit intermediate the heating unit and the receptacle for supporting the receptacle and for transferring heat from the heating unit to the receptacle; a condiment container for holding a condiment for the heated liquid; a secondary heat transfer unit mounted on the housing for supporting the condiment container and for transferring heat from the heating means to the condiment container.

In a further embodiment of my invention, I provide a beverage brewing apparatus including a housing having a reservoir for a supply of liquid; a heating unit mounted on the housing; a receptacle for receiving liquid from the reservoir; a dispenser mounted on the housing for dispensing liquid from the reservoir means into the receptacle; a primary heat transfer unit mounted on the housing for supporting the receptacle and for transferring heat from the heating unit to the receptacle; a condiment container for holding a condiment for the heated liquid; a secondary heat transfer unit mounted on the housing for transferring heat from the heating unit to the condiment container; and, a storage area in the housing for the condiment container.

In another embodiment of my invention, I provide a beverage brewing apparatus including a housing having a reservoir for a supply of liquid; heating means mounted on the housing and operatively associated with the reservoir for heating the liquid; a receptacle positioned above the heating means for receiving heated liquid from the reservoir; a dispenser mounted on the housing for dispensing heated liquid from the reservoir into the receptacle; a primary heat transfer unit intermediate the heating unit and the receptacle for supporting the receptacle and for transferring heat from the heating unit to the receptacle; a condiment container positioned adjacent the primary heat transfer unit for holding a condiment for the heated liquid; a secondary heat transfer unit mounted on the housing for supporting the condiment container and for transferring heat from the heating means to the condiment container.

In still a further embodiment of my invention, I provide a beverage brewing apparatus including a housing having a reservoir for a supply of liquid; a heating unit; a receptacle for receiving liquid from the reservoir; a dispenser for dispensing liquid from the reservoir into the receptacle; a condiment container; a dispenser operatively associated with the heating unit for transferring heat from the heating unit to the condiment container; a storage area for the condiment container in the housing adjacent the receptacle.

In yet another embodiment of my invention, I provide a beverage brewing apparatus including a housing having a reservoir for a supply of liquid; a receptacle for receiving liquid from the reservoir; a dispenser for dispensing liquid from the reservoir into the receptacle; a condiment container partially concealed in the housing; and, a heat unit for heating the condiment container.

In still a further embodiment of my invention, I provide a beverage brewing apparatus including a free standing unitary housing having a reservoir for a supply of liquid; a receptacle for receiving liquid from the reservoir; a dispenser for dispensing liquid from the reservoir means into the receptacle; a condiment container; a storage area on the housing for the condiment container; and, a heating unit to heat the condiment container when the condiment container is in the storage area.

DETAILED DESCRIPTION OF THE INVENTION

Figure 1B:
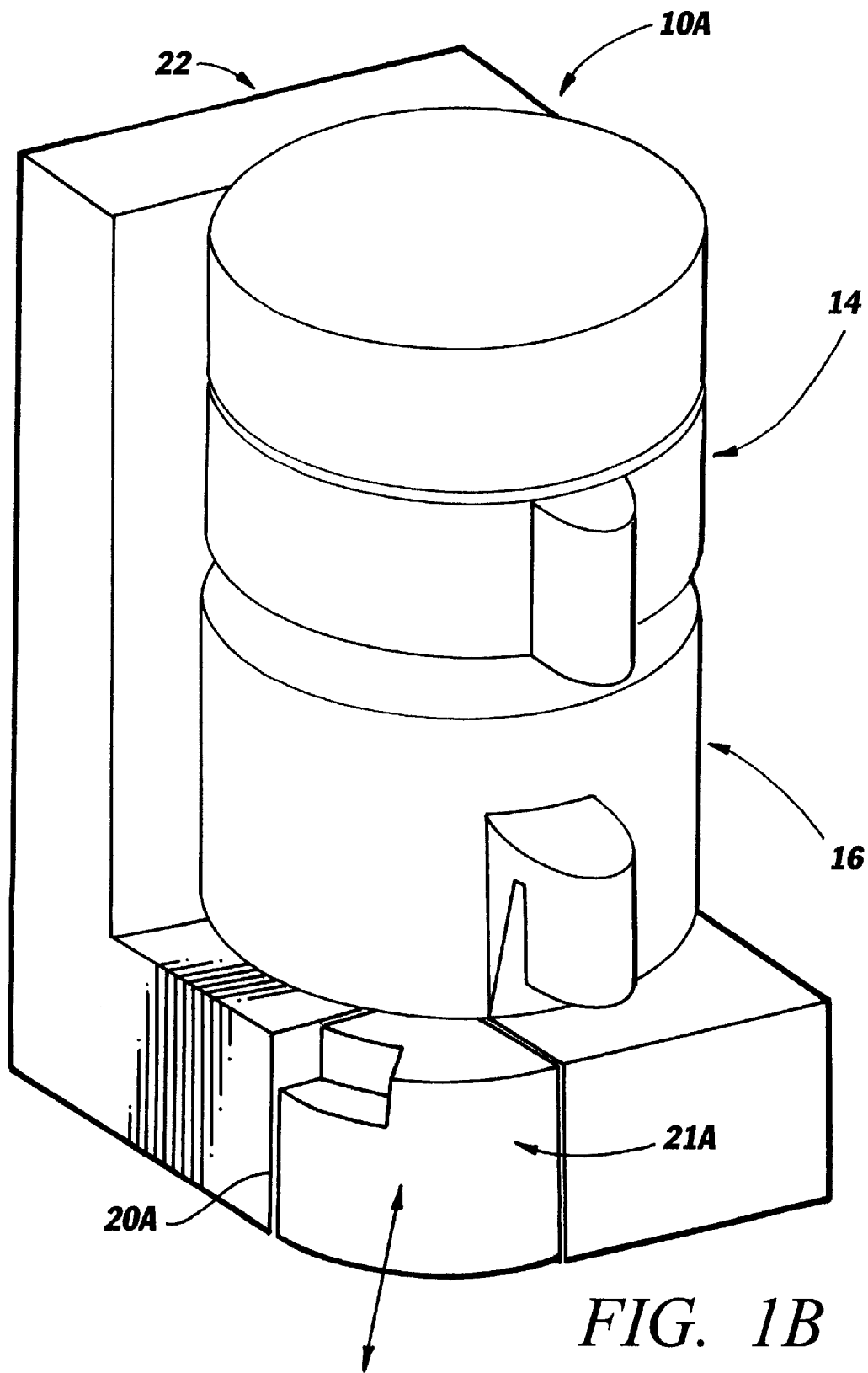
Figure 1C:
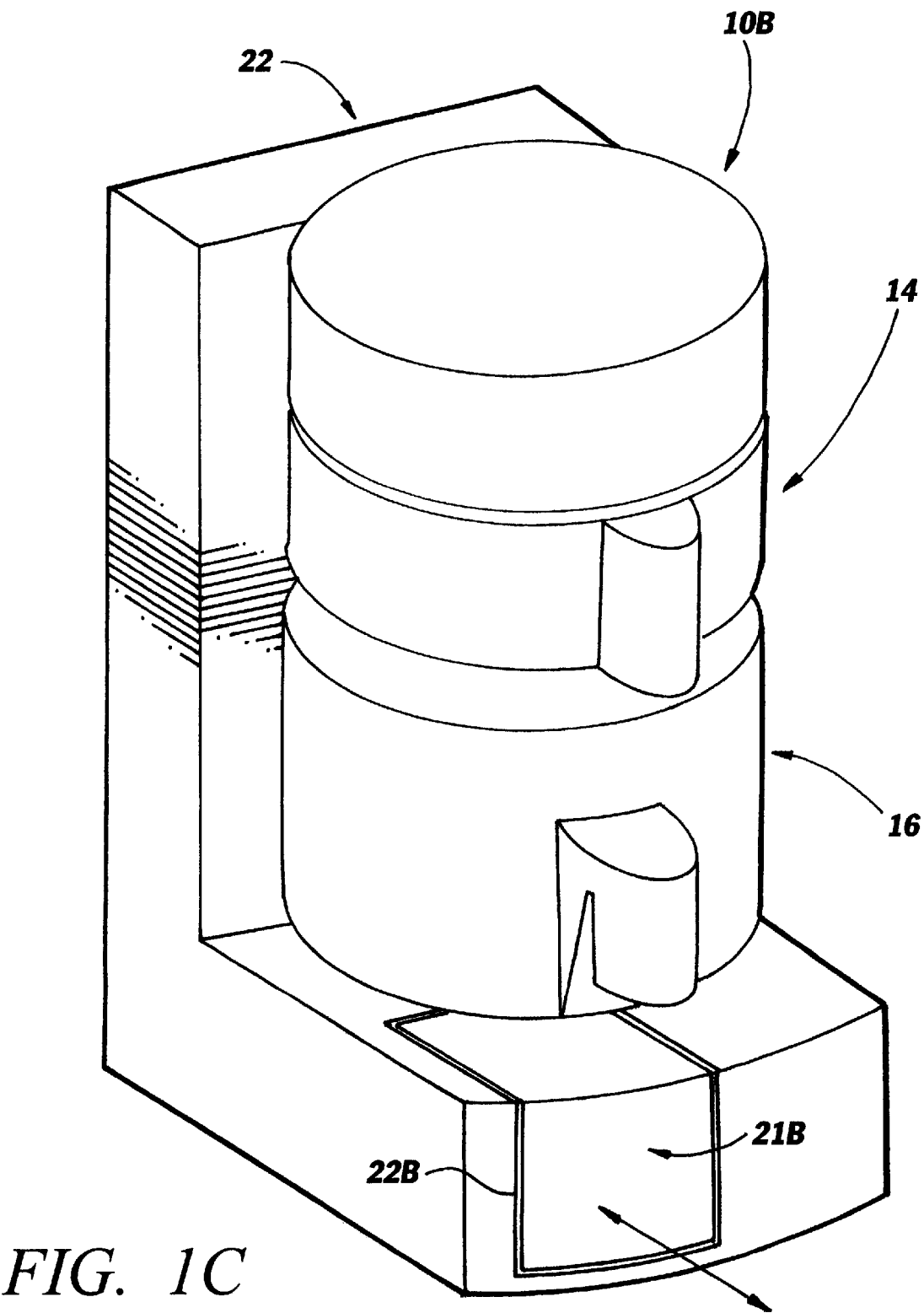

Turning now to the drawings, which depict the presently preferred embodiments of the invention for the purpose of illustrating the practice thereof and not by way of limitation, and in which like reference characters refer to corresponding elements throughout the several views, FIGS. 1A to 1C illustrate substantially identical beverage brewing units 10, 10A, and 10B, respectively, each including a unitary, free standing housing 22 and a reservoir 11 and plate 25 mounted on each housing 22. The reservoir is interconnected by conduits 12 and 13 with a conduit 27 in the base 29 of housing 22. Conduit 27 circumscribes electrical resistance heating coil or element 26. Water or another liquid from reservoir 11 circulates through conduits 12, 13 and 27. Water traveling through conduit 27 is heated by element 26. Water is circulated through conduits 12, 13, 27 by utilizing a pump, by utilizing the propensity of hot water to rise and cold water to sink, or by utilizing any other desired means. A coffee pot, a tea pot, or any other desired receptacle 16 sets on flat heat conductive plate 25 and is circumscribed by raised rim 18 extending around plate 25. In well known fashion, perforated filter holder 14 holds coffee or tea grounds and a porous paper or other filter such that when heated water from reservoir 11 is dispensed through nozzle 40 or any other water dispensing means and flows through filter 14 into receptacle 16, the coffee or tea ground are retained in filter holder 14 by the filter paper and do not fall into receptacle 16. Filter holder 14 includes handle 15. Receptacle 16 includes handle 17. Plate 25 conducts heat from element 26 to receptacle 16.

In the event beverage brewing unit 10 dispenses hot chocolate or some other hot drink, it may be desirable not to utilize a filter holder 14 and instead to simply dispense hot beverage directly into a cup or other receptacle 16.

Beverage brewing unit 10 includes a rectangular cup 21 of milk, cream, or another desired condiment 22. Cup 21 slides in the directions indicated by arrows A into and out of a storage area 41 formed on housing 21. Area 41 includes a rectangular mouth 20. When cup 21 is inserted in area 41 in the manner illustrated in FIG. 3, three walls or sides of cup 21 are concealed from view inside housing 22.

Beverage brewing unit 10A includes a cup 21A which is slidably inserted through opening 20A into and out of housing 22.

Beverage brewing unit 10B includes a cup 21B which is slidably inserted through opening 22B into and out of housing 22.

Figure 2:
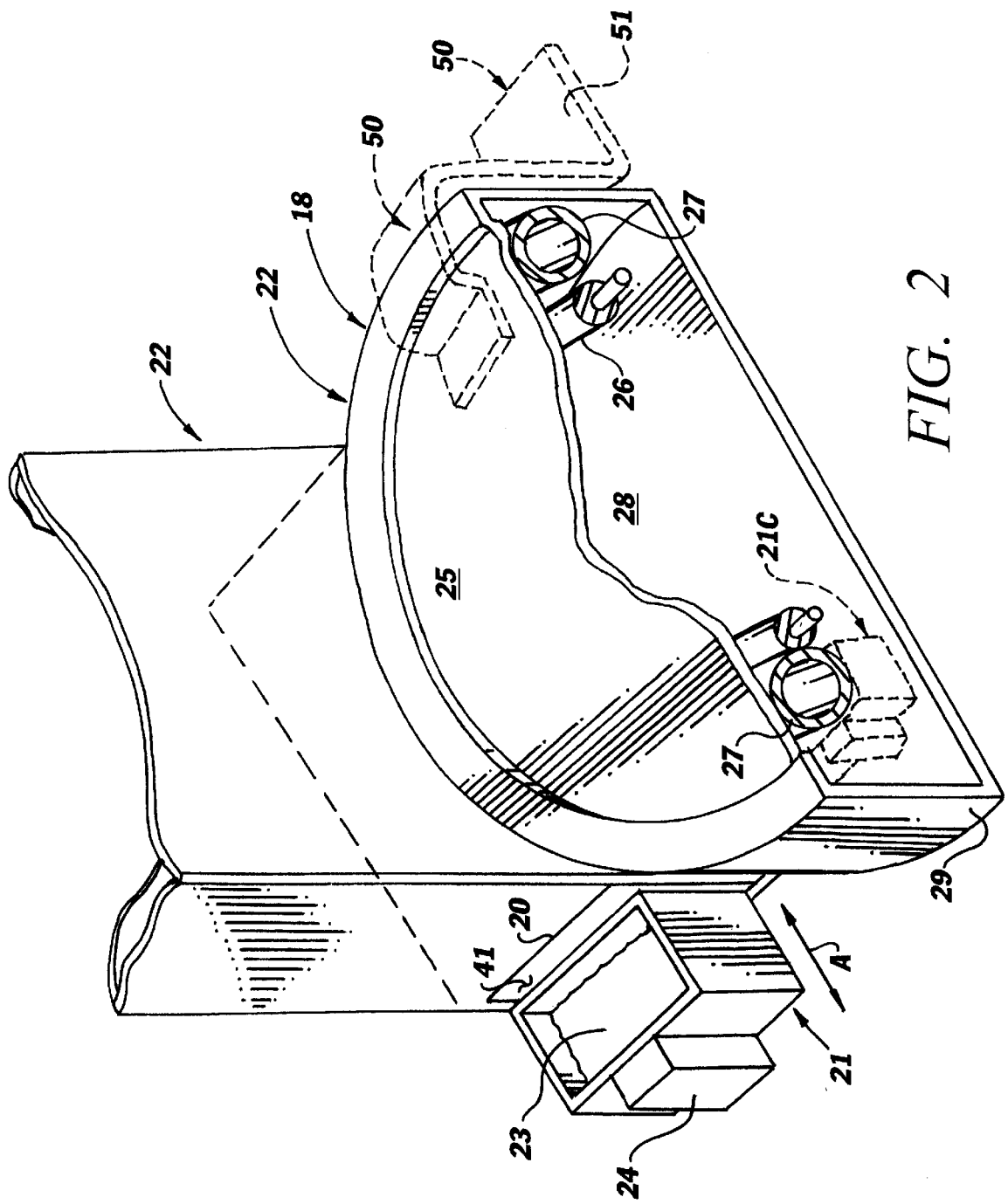
FIG. 2 is a partial section view of the coffeemaker of FIG. 1A illustrating additional internal construction details thereof; and, FIG. 3 is a side section view of the coffeemaker of FIGS. 1A and 2 further illustrating the construction thereof.
Figure 3:
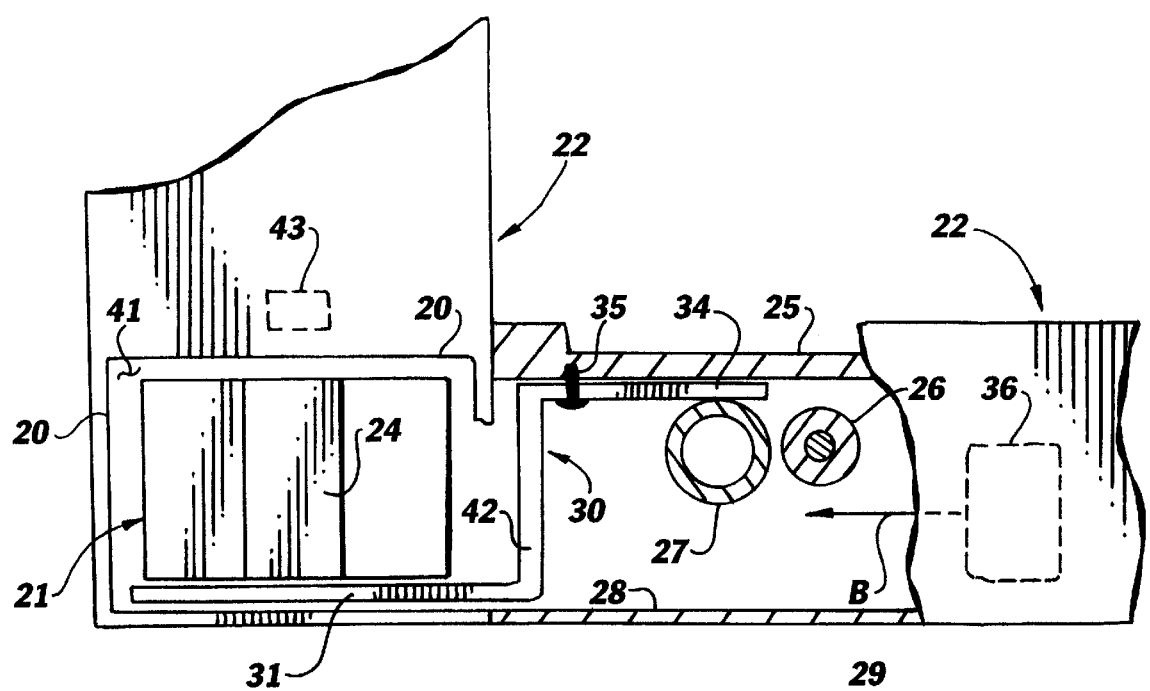

As illustrated in FIG. 3, when cup 21 is in storage area 41, cup 21 sets on plate 31 of heat conductive stair-step member 30. Member 30 includes interconnected flat plates 34, 42, and 31. Plate 34 is connected to plate 25 with a least one rivet 35 or other fastener. Heat from plate 25 is conducted through member 30 to plate 31, and from plate 31 to cup 21 to heat cup 21. Plate 25, member 30, and cup 21 can be fabricated from any desired material or materials as long as a desired amount of heat is conducted from plate 25 though member 30 to cup 21 to heat the milk or other condiment contained in cup 21. Heat from element 26 can be transferred to cup 21 via conduction (through plate 25 and member 30), by convection (if, for example, a fan 36 is utilized to blow warm air in the direction of arrow B in FIG. 3 from the vicinity of coil 26 to and over cup 21), and/or by radiation. In one embodiment of the invention, when a cup 21C (indicated by dashed lines in FIG. 2) is inserted into housing 22, cup 21 is positioned on the floor 28 of base 29 under or near element 26 such that radiant heat from element 26 strikes and heats cup 21C and/or the condiment in the cup 21C. As used herein, when a cup 21, 21A, 21B, 21C or another component of a coffeemaker or other beverage unit is described as being on housing 22, the component can be mounted on or can be in housing 22.

In each of the embodiments of the invention illustrated in FIGS. 1 to 3, the cup 21, 21A, 21B, 21C, as the case may be, is adjacent element 26 when cup 21 is inserted in housing 22 to be heated. Although positioning a cup adjacent element 26 is not necessary in the practice of the invention, it is preferred because it reduces the distance heat has to travel from coil 26 to cup 21. This problem may, however, be remedied by incorporating a second heating coil or unit 43 in beverage unit 10 to generate heat for cup 21.

In use in a conventional automatic drip coffeemaker, a filter and fresh coffee grounds are placed in filter holder 14. Holder 14 is slid into housing 22 to the position illustrated in FIGS. 1A to 1C. Reservoir 11 is charged with water. Element 26 is activated, usually by plugging the automatic drip coffeemaker in to a 110 VAC wall socket. Element 26 produces heat which radiates to plate 25 and warms receptacle 16. The heat produced by element 26 also warms water flowing through conduit 27. When the water in reservoir 11 is sufficiently warm, the water automaticaly drips or flows through nozzle 11 into filter holder 14 and contacts coffee grounds in filter holder 14. After contacting coffee grounds in holder 14, the heated water drips or flows through perforations (not visible) in the base of holder 14 and into receptacle or carafe 16. Heat from plate 25, as well as radiant heat from element 26, is absorbed by member 30 and conducted through plates 34, 42 and 31 to cup 21 to warm cup 21 and the condiment stored in cup 21. Cup 21 is removed from storage area 41 and heated condiment from cup 21 is poured into receptacle 16 or into a cup in which heated beverage from receptacle 16 has been or will be poured.

In FIGS. 1 to 3, cup 21 is located adjacent plate 25 and is, at least in part, positioned beneath plate 25. As would be appreciated by those of skill in the art, cup 21 can be positioned above plate 25. Further, an existing beverage unit can be retrofitted in any desired manner to utilize a condiment cup 21. For example, an opening can be cut in the base 29 such that an appropriately sized condiment cup 21 can be slid over floor 28 beneath coil 26 to receive radiant heat. Or, an appropriately shaped heat conductive member 50 can be attached to or simply placed in contact with plate 25 to carry heat to a cup positioned adjacent base 29 and in contact with foot 51 of member 50. Or, a small fan can be provided to carry heat from plate 25 or coil 26 to a nearby condiment cup 21C.

Any desired heating means can be utilized in conjunction with or separately from element 26. For example, propane, sunlight and other energy sources can be utilized to generate heat. Most coffeemakers utilize either a calrod (tubular) heater or a halogen lamp.

In an alternate embodiment of the invention, unitary plate 25 is shaped and dimensioned and sized such that cup 21 can be set on plate 25 next to receptacle 16 when receptacle 16 is also setting on plate 25 in the position shown in FIGS. 1A to 1C. The portion of plate 25 in which cup 21 sets is the storage area for cup 21. Beverage apparatus constructed in accordance with the invention can dispense cold, instead of hot, beverages.

Regardless of whether the condiment in cup 21 is heated by conduction, by convection, or by radiation, it can be important to provide a sufficient quantity of heat over a period of time in order to maintain the condiment at a desired minimum temperature during that period of time. Maintaining a condiment at a desired minimum temperature can be important to avoid spoilage of the condiment, to maintain the condiment in a particular physical state (i.e., in a liquid state), or to satisfy some other requirement or desired purpose. For example, if milk is the condiment in cup 21, then the milk is heated to and maintained at temperature sufficient to prevent the milk from spoiling during a desired time period. Typically, the milk is maintained at a temperature sufficient to prevent spoilage for at least a couple of hours.

One particular advantage of the invention is that when heat for cup 21 is supplied by the same element 26 which heats receptacle 16, cup 21 is normally heated at the same time and for as long as receptacle 16 is heated. This is particularly the case when heat is conductively transferred from element 26 to cup 21: as long as element 26 provides heat, a portion of the heat is conducted via a member 30 or 50 to a cup 21 in contact with that member.

Having described my invention in such terms as to enable those skilled in the art to understand and practice it, and having described the presently preferred embodiments thereof, I claim:

1. A beverage brewing apparatus including
   (a) a housing having a reservoir means for a supply of liquid and including an outer wall and an opening formed through said outer wall, said wall having an outer surface with a contour, said opening including a peripheral edge adjacent said outer surface of said outer wall;
   (b) a storage area in said housing adjacent and extending inwardly from said opening;
   (c) heating means mounted on said housing extending at least in part above said opening and operatively associated with said reservoir means for heating said liquid;
   (d) primary heat transfer means adjacent at least a portion of said heating means to receive heat from said heating means;
   (e) a receptacle removably mounted on said primary heat transfer means to receive heated liquid from said reservoir means and to receive heat from said primary heat transfer means;
   (f) filter means mounted on said housing;
   (g) a substance retained in said filter means to flavor said liquid;
   (h) means mounted on said housing for dispensing heated liquid from said reservoir means through said substance and said filter into said receptacle such that said liquid is flavored on passing through said substance;
   (i) a condiment container for holding a condiment for the liquid dispensed from said reservoir means through said filter into said receptacle, said container
      (i) being shaped and dimensioned to fit through said opening to slide into a storage position in which said container extends from said opening into in said storage area such that a part of said container substantially fills said opening,
      (ii) including an outer wall surface portion which, when said container is in said storage position in said storage area, is generally flush with said peripheral edge of said opening and conforms to said contour of said outer wall surface.

2. A beverage brewing apparatus including
   (a) a housing having a reservoir means for a supply of liquid and including an outer wall and an opening formed through said outer wall, said opening including a peripheral edge adjacent said outer wall;
   (b) a storage area in said housing adjacent and extending inwardly from said opening;
   (c) heating means mounted on said housing and extending at least in part above said opening and operatively associated with said reservoir means for heating said liquid;
   (d) primary heat transfer means adjacent at least a portion of said heating means to receive heat from said heating means;
   (e) a receptacle removably mounted on said primary heat transfer means to receive heated liquid from said reservoir means and to receive heat from said primary heat transfer means;
   (f) filter means mounted on said housing;
   (g) a substance retained in said filter means to flavor said liquid;
   (h) means mounted on said housing for dispensing heated liquid from said reservoir means through said substance and said filter into said receptacle such that said liquid is flavored on passing through said substance;
   (i) secondary heat transfer means extending from at least one of the pair comprising
      (i) said heating means, and
      (ii) said primary heat transfer means; to said storage area; and,
   (j) a condiment container for holding a condiment for the liquid dispensed from said reservoir means through said filter into said receptacle, said container being shaped and dimensioned to fit through said opening and to slide into a storage position in which said container extends from said opening into said storage area adjacent said secondary heat transfer means to receive heat from said secondary heat transfer means.

3. A beverage brewing apparatus including
(a) a housing having a reservoir means for a supply of liquid and including an outer wall and an opening formed through said outer wall, said opening including a peripheral edge adjacent said outer wall;
(b) a storage area in said housing adjacent and extending inwardly from said opening;
(c) heating means mounted on said housing and extending at least in part above said opening and operatively associated with said reservoir means for heating said liquid;
(d) primary heat transfer means adjacent at least a portion of said heating means to receive heat from said heating means;
(e) a receptacle removably mounted on said primary heat transfer means to receive heated liquid from said reservoir means and to receive heat from said primary heat transfer means;
(f) filter means mounted on said housing;
(g) a substance retained in said filter means to flavor said liquid;
(h) means mounted on said housing for dispensing heated liquid from said reservoir means through said substance and said filter into said receptacle such that said liquid is flavored on passing through said substance;
(i) secondary heat transfer means extending from at least one of the pair comprising
  (i) said heating means, and
  (ii) said primary heat transfer means; to said storage area; and,
(j) a condiment container for holding a condiment for the liquid dispensed from said reservoir means through said filter into said receptacle, said container being shaped and dimensioned to fit through said opening and slide into a storage position in which said container extends from said opening into said storage area and to slide onto and directly contact said secondary heat transfers means.

4. A beverage brewing apparatus including
(a) a housing having a reservoir means for a supply of liquid and including
  (i) a wall having an arcuate outer surface, and
  (ii) a fixed permanent opening formed through said outer wall, said opening including a peripheral edge adjacent said arcuate outer surface;
(b) a storage area in said housing adjacent and extending inwardly from said opening;
(c) heating means mounted on said housing and operatively associated with said reservoir means for heating said liquid;
(d) primary heat transfer means adjacent at least a portion of said heating means to receive heat from said heating means;
(e) a receptacle removably mounted on said primary heat transfer means to receive heated liquid from said reservoir means and to receive heat from said primary heat transfer means;
(f) filter means mounted on said housing;
(g) a substance retained in said filter means to flavor said liquid;
(h) means mounted on said housing for dispensing heated liquid from said reservoir means through said substance and said filter into said receptacle such that said liquid is flavored on passing through said substance;
(i) a condiment container for holding a condiment for the liquid dispensed from said reservoir means through said filter into said receptacle, said container
  (i) being shaped and dimensioned to fit through and substantially fill said opening and slide into a storage position in which said container extends from said opening into said storage area, and
  (ii) including an arcuate wall portion which, when said container is in said storage position in said storage area, is generally flush with said peripheral edge of said opening and conforms to said contour of said outer wall surface.

5. A beverage brewing apparatus including
(a) a housing having a reservoir means for a supply of liquid and including an outer wall and an opening formed through said outer wall, said wall having an outer surface with a contour, said opening including a peripheral edge adjacent said outer surface;
(b) a storage area in said housing adjacent and extending inwardly from said opening;
(c) heating means mounted on said housing and operatively associated with said reservoir means for heating said liquid, said heating means including at least a portion positioned above said opening;
(d) primary heat transfer means adjacent at least a part of said portion of said heating means positioned above said opening, said primary heat transfer means receiving heat from said heating means;
(e) a receptacle removably mounted on said primary heat transfer means to receive heated liquid from said reservoir means and to receive heat from said primary heat transfer means;
(f) filter means mounted on said housing;
(g) a substance retained in said filter means to flavor said liquid;
(h) means mounted on said housing for dispensing heated liquid from said reservoir means through said substance and said filter into said receptacle such that said liquid is flavored on passing through said substance;
(i) a condiment container for holding a condiment for the liquid dispensed from said reservoir means through said filter into said receptacle, said container
  (i) being shaped and dimensioned to fit through and substantially fill said opening and to slide into a storage position in which said container extends from said opening into said storage area,
  (ii) including an outer wall surface portion which, when said container is in said storage position in said storage area, is generally flush with said peripheral edge and conforms to said contour of said outer wall surface, and
  (iii) including handle means which, when said condiment container is in said storage position extending from said opening into said storage area, is positioned in said opening, and
    at least partially circumscribed by said peripheral edge.

* * * * *